United States Patent
Berger

[15] 3,697,854
[45] Oct. 10, 1972

[54] REGULATED DC-DC POWER SUPPLY

[72] Inventor: James K. Berger, Sherman Oaks, Calif.

[73] Assignee: Pioneer Magnetics, Inc., Santa Monica, Calif.

[22] Filed: Jan. 27, 1972

[21] Appl. No.: 221,272

Related U.S. Application Data

[63] Continuation of Ser. No. 58,042, July 24, 1970, abandoned.

[52] U.S. Cl. .......................... 321/2, 321/4, 321/11, 321/18, 331/112
[51] Int. Cl. .......................... H02m 3/32, H03k 3/30
[58] Field of Search ........ 321/2, 4, 18, 11, 14; 320/1; 323/18; 331/112

[56] References Cited

UNITED STATES PATENTS

| | | | |
|---|---|---|---|
| 3,575,153 | 4/1971 | Hardin et al. | 321/2 X |
| 3,435,320 | 3/1969 | Lee et al. | 321/2 |
| 3,526,823 | 9/1970 | Genuit | 321/2 |

Primary Examiner—William H. Beha, Jr.
Attorney—Keith D. Beecher

[57] ABSTRACT

An improved direct-current power supply is provided for converting alternating-current power or direct-current power into direct-current power, and which has particular utility in energizing electronic equipment such as computers, data processors, and the like. The power supply of the invention is a regulated fly-back type in which electric energy from an appropriate source is alternately stored in an electromagnetic device, such as a transformer, and then released into a load. The improved power supply of the invention includes control circuitry which causes a constant amount of energy to be stored during each cycle independently of source voltage, and which enables the power supply to exhibit highly favorable regulation characteristics through a wide range of loads.

4 Claims, 5 Drawing Figures

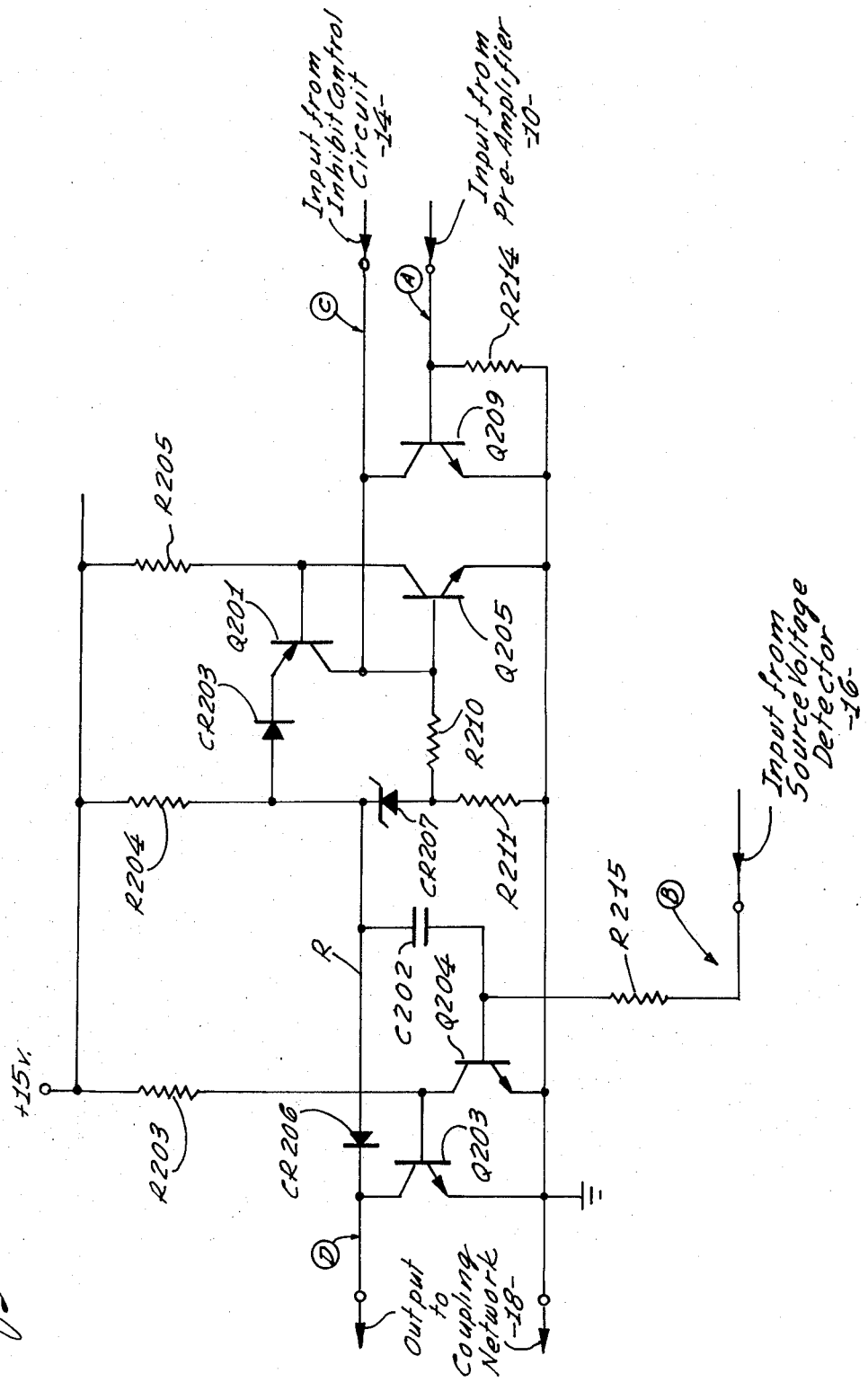

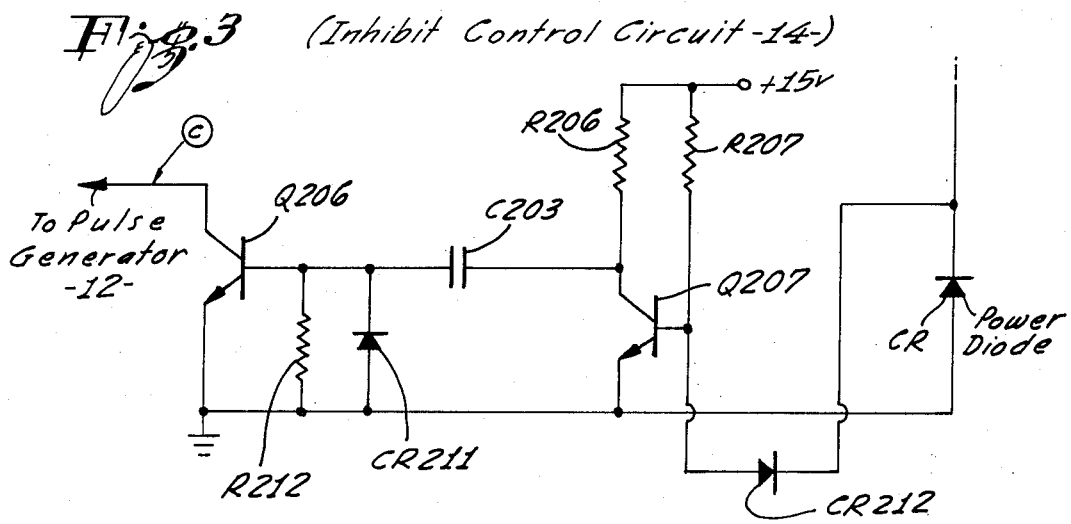
Fig. 3 (Inhibit Control Circuit -14-)
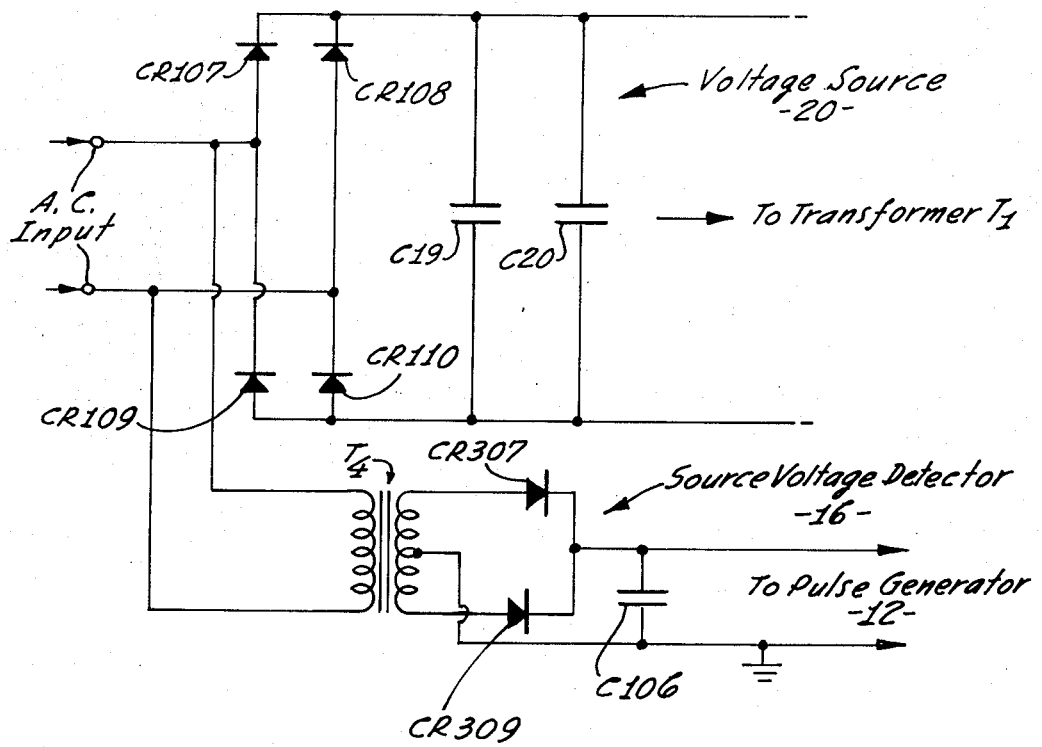
Fig. 4 (Voltage Source -20- & Source Voltage Detector -16-)

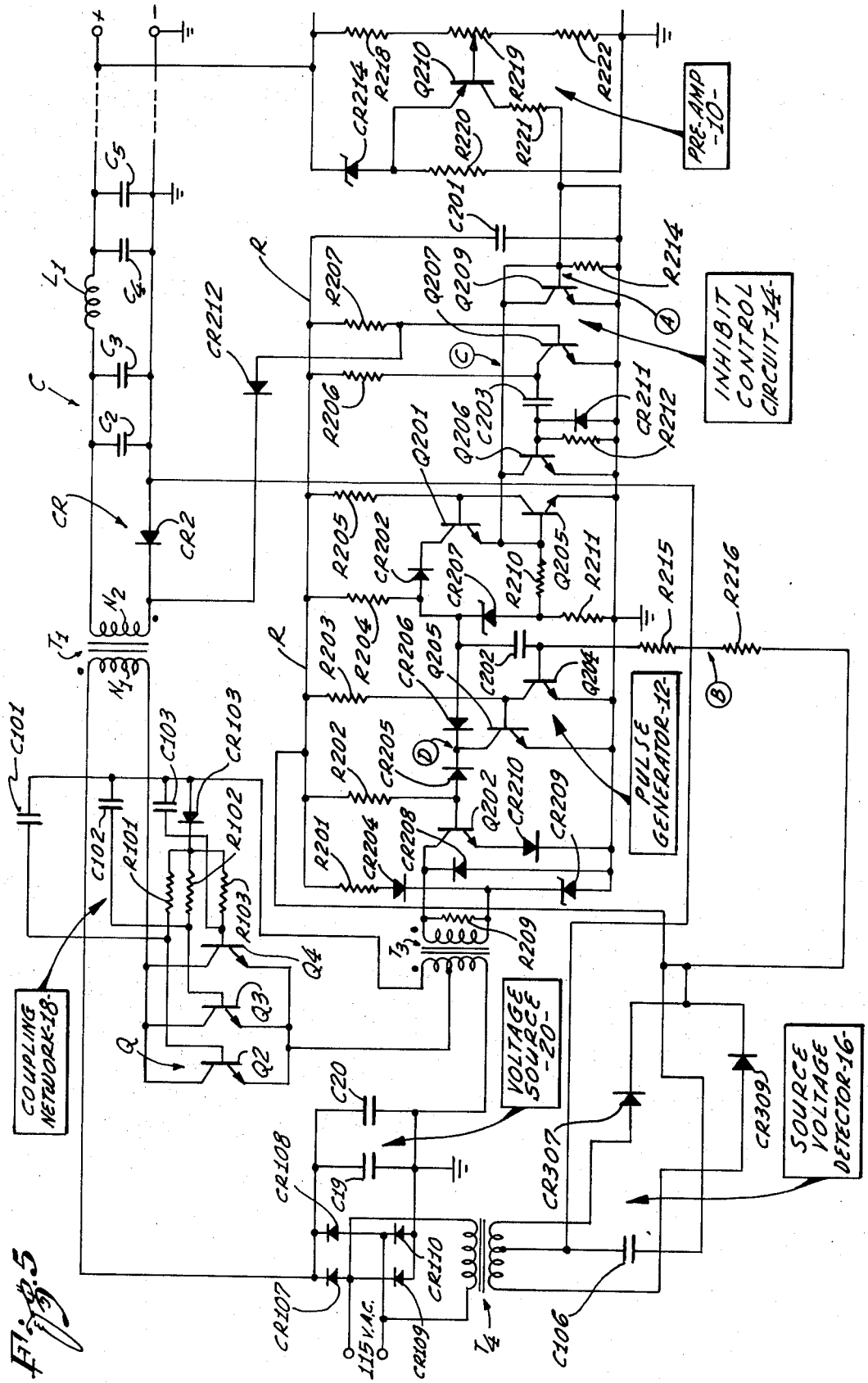

REGULATED DC-DC POWER SUPPLY

This application is a continuation of copending application Ser. No. 58,042, filed July 24, 1970, now abandoned.

BACKGROUND OF THE INVENTION

The improved and unique direct-current power supply of the present invention is intended to replace the usual relatively heavy, costly and inefficient prior art power supply. For example, a power supply constructed in accordance with the concepts of the present invention has been built having a weight less than one-third the weight of an equivalent prior art power supply; and of approximately two-thirds the size of the prior art power supply, and at a lower cost.

A feature of the power supply of the present invention which has particular utility when used in computer applications, for example, is its capability of maintaining power output for an appreciable time after an alternating-current power failure has occurred. For example, a constructed embodiment of the invention has maintained power for more than 20 milliseconds at full load after such a power failure, as compared with a usual 2 millisecond hold time in the prior art systems. This hold interval gives the computer time to clear the information being processed into memory so that it is not lost.

The improved power supply of the invention, in the embodiment to be described, is controlled, as mentioned above, to provide a fixed amount of energy storage for each cycle independent of the source voltage for regulation purposes. The power supply system to be described also provides overload and short-circuit protection. Moreover, the power supply is such that it may be activated under full load conditions.

BRIEF DESCRIPTION OF THE DRAWINGS

FIG. 2 is a circuit diagram of a pulse generator which may be included in the system of FIG. 1;

FIG. 3 is a circuit diagram of an inhibit control circuit which also may be included in the system of FIG. 1;

FIG. 4 is a circuit diagram of a voltage source and source voltage detector circuit which likewise may be included in the system of FIG. 1; and FIG. 5 is a circuit diagram of a power supply system representative of one embodiment of the invention.

DETAILED DESCRIPTION OF THE ILLUSTRATED EMBODIMENT

Figure 1:
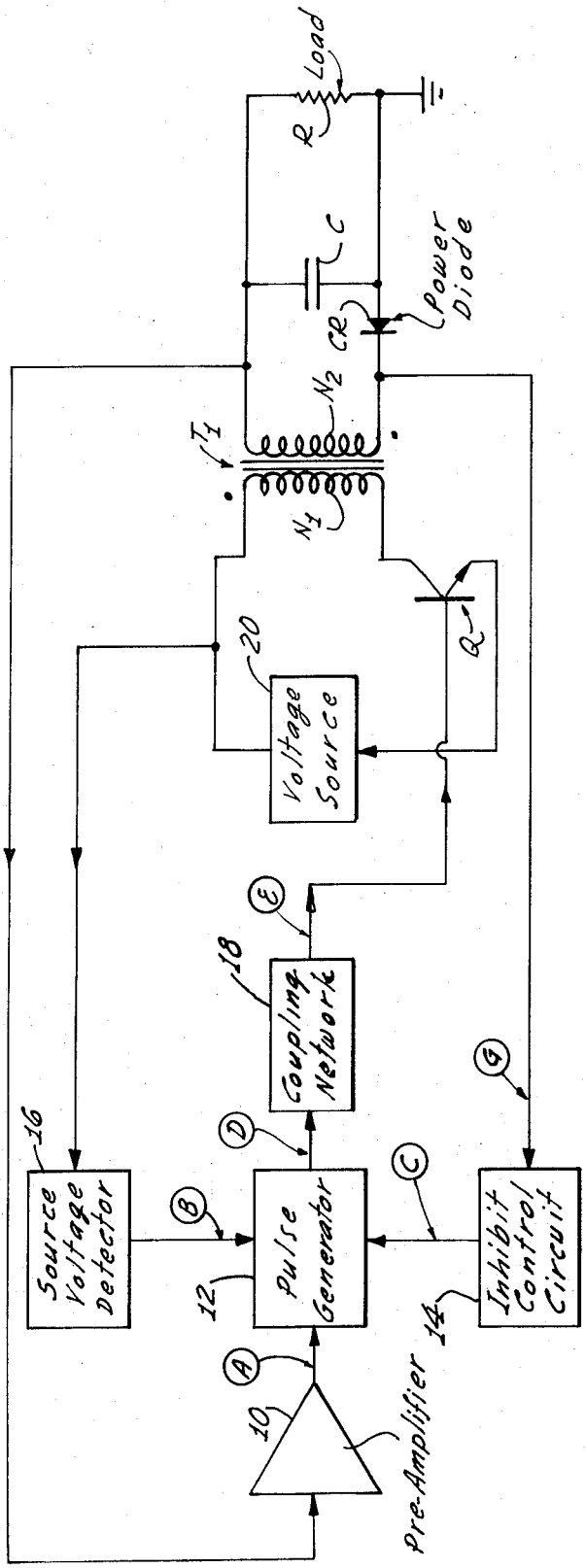
FIG. 1 is a schematic diagram partly in block form and partly in circuit detail representing a system constructed to incorporate the concepts of the present invention.

The power supply system of the invention, as mentioned above, is a fly-back regulated type. The system includes a voltage source 20 which is connected to the primary winding $N_1$ of an electromagnetic device, such as a transformer $T_1$, through a switching transistor designed Q in FIG. 1. The secondary $N_2$ of the transformer $T_1$ is connected to an appropriate load designated R. A capacitive element C is also connected across the secondary $N_2$. A power diode designated CR is incorporated between the secondary $N_2$ and the common or ground side of the capacitive element C and load R.

The aforesaid power diode CR is connected to an inhibit control circuit 14 which, in turn, is connected back to a pulse generator 12. A source voltage detector 16 is also connected to the output of the voltage source 20 and back to the pulse generator 12. The secondary $N_2$ of the transformer $T_1$ is also connected to a pre-amplifier 10 which, in turn, is connected to the pulse generator 12. The pulse generator 12 is coupled through an appropriate coupling network 18 to the switching transistor Q.

The pulse generator 12 produces a train of pulses on lead D, and these pulses are amplified in the coupling network 18 and applied through a suitable impedance matching and isolating network to the lead designated E, and by that lead to the base of the switching transistor Q. The pulses generated by the pulse generator 12 have a suitable duration of, for example, 30 microseconds, so as to allow a relatively large current of, for example, 12 amperes to flow in the primary winding $N_1$ of the transformer $T_1$. This primary current is zero when the transistor Q is first made conductive, and it increases linearly with time according to the magnitude of the voltage from the source 20, divided by the inductance of the primary winding $N_1$ of the transformer $T_1$. At the end of each pulse from the pulse generator 12, the switching transistor Q is turned off, and the energy which has been stored in the transformer $T_1$ is then released into the load R through the power diode CR.

The source voltage detector 16 provides a control signal on the lead B which is proportional to the source voltage, and this signal is applied to the pulse generator 12. The pulse generator contains a network which varies the duration of the generated pulses in an inverse proportional relationship with the amplitude of the control signal from the detector 16. This causes the product of the duration of the individual pulses generated by the pulse generator and the amplitude of the voltage from source 20 to be maintained constant. Since the current flowing in the primary winding $N_1$ of the transformer $T_1$ at the time of each turn-off of the switching transistor Q is proportional to the product of the pulse width and amplitude of the source voltage, the current will then be the same at the end of each pulse and hence the energy stored will be the same at the end of each pulse, regardless of the source voltage amplitude, and providing that the energy stored at the beginning of each pulse is zero.

The inhibit control circuit 14 senses whether the power diode CR is conducting, and prevents pulses from occurring until the diode CR is non-conductive. Since, when the switching transistor Q is rendered non-conductive, any current existing in the transformer $T_1$ must flow through the diode CR, the inhibit control circuit 14 indicates when the energy in the transformer $T_1$ has been reduced to zero. This is achieved by sensing the point at which current no longer flows in the power diode CR.

Therefore, the inhibit control circuit 14 prevents the pulse generator 12 from generating a pulse until all the energy stored in the transformer $T_1$ by the preceding pulse has been released. This means that the current build-up in the transformer $T_1$ can never be cumulative from cycle to cycle, and there is no possibility for the switching transistor Q to be destroyed.

The pre-amplifier circuit 10 senses the amplitude of the output voltage of the power supply, and this circuit prevents the pulse generator 12 from generating pulses when the output voltage is above a pre-established threshold. In this way, regulation of the output voltage is accomplished. During normal operation of the power supply system, when the output voltage decays due to dis-charge of the output filter capacitor C by the load R below the pre-established level, a pulse is initiated by the pulse generator 12.

During each pulse from the pulse generator 12 the transistor Q is switched on, and energy is stored in the transformer $T_1$ as the output voltage continues to decay. At the end of the pulse, the switching transistor Q is rendered non-conductive and energy is released into the load filter capacitor C, through the power diode CR. The latter energy is sufficient to charge the filter capacitor C to above the pre-established threshold. When the output voltage again decays to the preset threshold, a new pulse is initiated from the pulse generator 12, but not before all the energy from the previous pulse has been released, due to the action of the inhibit control circuit 14 in sensing current flow in the power diode CR.

From the foregoing description, it will be appreciated that the energy in each pulse is maintained constant, and that the repetition rate of the pulses is governed by the load demand. Specifically, the pulses generated by the pulse generator 12 and stored in the transformer $T_1$ will occur just often enough to supply the output demand, and voltage regulation is thereby achieved.

When overload conditions occur, the output voltage becomes less than the pre-established threshold. Under such conditions, a new pulse will be generated by the pulse generator 12 as soon, as but not before, the energy in the transformer $T_1$ is entirely released, thus providing maximum possible output power. As the overload is increased, and the output voltage correspondingly reduced, the repetition rate decreases, because more time is required to discharge the transformer $T_1$ after each pulse from the pulse generator. This results in a limiting of the output current, which protects the components of the system.

It is conceivable that a slight negative loading of the power supply from some external source could cause a continuous flow of current through the power diode CR prior to the system being turned on. Under such conditions, the system would normally never initiate a pulse due to the inhibit control circuit 14 continuously sensing current in the power diode CR. To prevent such a situation, the inhibit control circuit is AC coupled to a DC restoration circuit, so that it operates in the desired manner during normal operating frequencies, but cannot inhibit the pulse generator 12 for any prolonged interval in the event of a continuous current in the power diode CR.

The pulse generator 12 may have a circuit configuration such as shown in FIG. 2. The circuit includes, for example, an NPN transistor Q209 whose collector is connected to the lead C from the inhibit control circuit 14, and whose emitter is grounded. The base of the transistor Q209 is connected to the lead A from the pre-amplifier 10, and to a grounded 3.3 kilo-ohm resistor R214. The collector of the transistor Q209 is connected to the collector of a PNP transistor Q201 and to the base of an NPN transistor Q205. The emitter of the transistor Q205 is grounded, and its collector is connected to the base of the transistor Q201 and to a 15 kiloohm resistor R205. The resistor R205 is connected to the positive terminal of a 15-volt auxiliary voltage source.

The collector of the transistor Q201 is also connected to the base of the transistor Q205 and to a 680 ohm resistor R210. The resistor R210 is connected to the junction of a Zener diode CR207 and a grounded 680 ohm resistor R211. The Zener diode is connected to a diode CR202 which, in turn, is connected to the emitter of the transistor Q201. The zener diode is also connected to a 4.7 kilo-ohm resistor R204 and to a 0.01 microfarad capacitor C202 and to a diode CR206. The resistor R204 is connected to the aforesaid positive terminal. The capacitor C202 is connected to the base of a transistor Q204 and through a 3.3 kilo-ohm resistor R215 to the lead B from the source voltage detector 16.

The emitter of the transistor Q204 is grounded, and its collector is connected to the base of an NPN transistor Q203 and through a 15 kilo-ohm resistor R203 to the positive terminal of the 15-volt source. The emitter of the transistor Q203 is grounded, and its collector, together with the diode CR206 is connected to the output lead D extending to the coupling network 18.

Prior to the generation of a pulse by the pulse generator circuit 12 of FIG. 1, the pre-amplifier 10 supplies current into the base of the transistor Q209 maintaining the transistor Q209 in a conductive condition. This holds the base of the transistor Q205 at ground potential, so that the latter transistor is non-conductive. The base of the transistor Q201 is now held positive by the resistor R205, and the transistor Q201 is also non-conductive. Current flows through the resistor R204 and through the Zener diode CR207, and through the resistors R210 and R211. The capacitor C202 is then charged to approximately the Zener voltage of the Zener diode CR207 which may, for example, be of the order of 5.1 volts.

The resistor R215 supplies base current to the transistor Q204 causing the transistor Q204 to be conductive. The resistor R203 supplies base current to the transistor Q203 only when the transistor Q204 is non-conductive. When transistor Q203 is non-conductive, the diode CR206 does not conduct current. When the preamplifier 10 ceases to supply current to the base of the transistor Q209, the resistor R214 establishes the base at ground potential, causing the transistor to be non-conductive. When the transistor Q209 is non-conductive, current flowing through the resistor R210 flows into the base of the transistor Q205, causing the latter transistor to become conductive. When the transistor Q205 becomes conductive, it supplies base current to the transistor Q201 which, in turn, adds current to the base of the transistor Q205, resulting in a regenerative action by which the transistors Q205 and Q201 become fully conductive.

Current through the emitter of the transistor Q201 and through the diode CR203 causes the lead R (connected to the resistor R204, to the capacitor C202, to the diodes CR203 and CR206 and to the Zener diode 207) to go negative. This, through the capacitor C202, causes the transistor Q204 to become non-conductive, and causes the transistor Q203 to become conductive, thereby initiating an output pulse. As the transistor Q203 becomes conductive, the diode CR206 conducts and forces the lead R to approximate ground potential. The transistor Q203 remains conductive until the capacitor C202 is discharged through the resistor R215 sufficiently to permit the base of the transistor Q204 to swing positive so as to render the transistor Q204 conductive, thereby forcing the transistor Q203 to its non-conductive state and terminating the output pulse.

Since the voltage charge level of the capacitor C202 is constant, the duration of the pulse generated by the circuit of FIG. 2 is a function of the current in the resistor R215, which is approximately proportional to the voltage on the lead B from the source voltage detector 16. When the output pulse of the circuit of FIG. 2 is terminated, the load voltage is increased by the energy released to the filter capacitor C of FIG. 1, so that the pre-amplifier 10 again supplies current to the base of the transistor Q209, and this prevents a new pulse from occurring until it is required.

Before a new pulse is generated by the circuit of FIG. 2, the capacitor C202 is charged through the resistor R215 to the voltage level of the Zener diode CR207. If the inhibit control circuit 14 forces the lead C to ground potential, a new pulse cannot occur, since the same condition is created in the circuit as was created by the conductivity of the transistor Q209.

The inhibit control circuit, as shown in FIG. 3, includes a diode CR212 which is connected to the power diode CR of FIG. 1. The diode CR212 is connected to the base of an NPN transistor Q207 and to a resistor R207. The resistor R207 may have a resistance of 15 kilo-ohms, and it is connected to the positive terminal of the 15-volt source. The emitter of the transistor Q207 is grounded, and the collector is connected to a resistor R206. The resistor R206 may have a resistance of 47 kilo-ohms, and it also is connected to the positive terminal of the 15-volt source.

The collector of the transistor Q207 is also connected to a capacitor C203 which, in turn, is connected to the base of an NPN transistor Q206 and to a grounded resistor R212 which may have a resistance of 10 kilo-ohms. The resistor R212 is shunted by a diode CR211. The emitter of the transistor Q206 is grounded, and the collector is connected to the pulse generator 12 over the lead C.

When the power diode CR is not conducting its cathode is positive with respect to its grounded anode. In such a condition, the diode CR212 is non-conductive and, the resistor R207 supplies base current to the transistor Q207, holding the transistor conductive. Capacitor CR203 is discharged. The resistor R212 holds the base of the transistor Q206 at ground potential, and the transistor Q206 is non-conductive, so that the circuit of FIG. 3 does not inhibit the pulse generator 12.

When the power diode CR conducts, however, its cathode becomes negative with respect to the grounded anode, and when that occurs, the diode CR212 is forward biased, which takes all the current of the resistor R207, so that the transistor Q207 is made non-conductive. Current now flows through the resistor R206 and through the capacitor C203 to the base of the transistor Q206, causing the transistor Q206 to become conductive, so that the lead C is established near ground potential so as to inhibit the operation of the pulse generator 12.

When the power diode CR ceases to conduct, the diode CR212 is again reverse biased, and the transistor Q207 is rendered conductive forcing the base of the transistor Q206 negative through the capacitor C203, and thus causing the transistor Q206 to become non-conductive.

The potential on the lead C now rises to a value so as to permit the pulse generator 12 to generate another pulse. If the power diode conducts for a substantial time interval, the capacitor C203 continues to charge as long as the transistor Q207 is non-conductive. When the capacitor C203 is nearly completely charged, the current through the resistor R212 becomes equal to the current through the resistor R206, and there is no current available to the base of the transistor Q206, so that the transistor Q206 becomes non-conductive permitting the pulse generator 12 to generate a pulse. This means that in the event a negative load causes a current to flow through the power diode CR during a stand-by condition, the system will still operate when turned on.

Whenever the pulse generator 12 generates a pulse, the transistor Q of FIG. 1 controlling the power transformer $T_1$ is rendered conductive, and the current through the power diode CR is removed. Then, the transistor Q207 is rendered conductive, and the capacitor C203 is discharged through the diode CR211, and normal operation resumes.

An appropriate circuit for the voltage source 20 and source voltage detector 16 is shown in FIG. 4. The alternating-current input is connected to a group of diodes designated CR107, CR108, CR109 and CR110. Appropriate capacitors C19 and C20 are connected across the rectifier, and the resulting rectified power is applied to the primary $N_1$ of the transformer $T_1$. The alternating-current input is also applied to the primary of the transformer $T_4$. The secondary winding of the transformer is connected to a pair of diodes CR308 and CR310, the cathodes of which are connected together and to the lead B so as to apply its output to the pulse generator 12. The center tap of the secondary winding of the transformer $T_4$ is grounded. Capacitor C106 is connected to lead B and to ground.

The source voltage for the system may be obtained by direct rectification of the alternating-current as shown in the upper circuit of FIG. 4, the diodes CR107, CR108, CR109 and CR110 being connected in a well known bridge connection, and the capacitors C19 and C20 serving as filter capacitors.

As shown in the lower part of the circuit of FIG. 4, the source voltage detector includes a small transformer $T_4$ whose primary is connected across the alternating-current input, and whose secondary is connected to a full-wave center tap rectifier including the diodes CR307 and CR309, and the filter capacitor C106 which may, for example, be of the order of 2,000 microfarads.

The values of the capacitors C19 and C20 and of the capacitor C106 are chosen so that the rate of discharge of the capacitors C19, C20 when the input alternating-current is removed is approximately equal to the rate of discharge of the capacitor C106, so that the voltage on the lead B will always track the voltage across the capacitors C19, C20 proportionately. If the voltage on the lead B is properly chosen, for example, at 15 volts, this voltage may also be used to supply the auxiliary voltage required by the circuits described above.

A complete circuit diagram for one embodiment of the power supply is shown, for example, in FIG. 5, and the circuit of FIG. 5 includes the individual circuits discussed above. In the circuit of FIG. 5, for example, the capacitor C of FIG. 1 across the secondary $N_2$ of the transformer $T_1$ is replaced by a group of 6,800 microfarad filter capacitors C2–C5 and a series choke coil $L_1$ is also included in the illustrated filter. Likewise, the power diode CR of FIG. 1 is represented in FIG. 5 by the power diode CR2.

As shown in the circuit of FIG. 5, the pre-amplifier 10 comprises a PNP transistor Q210 whose base is connected to a potentiometer R219 having a resistance of 250 ohms. The potentiometer R219 is connected to a 290 ohm resistor R218 and to a grounded resistor R222, the latter resistor also having a resistance of 390 ohms. The emitter of the transistor Q210 is connected to the junction of a Zener diode CR214 and a 470 ohm grounded resistor R220. The collector of the transistor Q210 is connected through a 2.2 kilo-ohm resistor R221 to the base of the input transistor Q209 of the pulse generator 12. A capacitor C201 of 6.8 microfarads is connected between the 15-volt positive potential lead and ground. The Zener diode CR214 and the resistor R218 are connected to the output of the power supply, so as to permit the output voltage to be compared to a reference and the difference to be amplified in the pre-amplifier 10 and applied to the pulse generator 12 so as to prevent operation of the pulse generator, as mentioned above, so long as the output voltage of the power supply is above a predetermined threshold value.

The source voltage detector 20 of FIG. 5 also is used to supply the 15-volt auxiliary voltage to the auxiliary voltage lead R in FIG. 5. Resistor R216 is connected to resistor R215 and is used to adjust the normal operating pulse width of the pulse generator.

In the circuit of FIG. 5, the switching transistor Q of FIG. 1 is replaced by three NPN transistors Q2, Q3 and Q4. The emitters of these transistors are connected to the center tap of the secondary winding of a transformer $T_3$. The primary winding of the transformer $T_3$ is connected to the collector of a NPN transistor Q202 and to the cathode of a Zener diode CR209, the anode of which is grounded. The collector of the transistor Q202 is also connected to a ground diode CR208, and the emitter of the tran-istor Q202 is connected to a grounded diode CR210. The cathode of the Zener diode is also connected to the cathode of a diode CR204 which, in turn, is connected through a 2.2 kiloohm resistor R201 to the 15-volt auxiliary voltage lead R. The output transistor Q203 of the pulse generator 12 has its collector connected through a diode CR205 to the base of the transistor Q202. The transistor Q202 and its associated circuitry constitutes the coupling network 18 of FIG. 1, and it causes the transistors Q2, Q3 and Q4 to become conductive whenever there is a pulse output from the pulse generator 12, so as to charge the transformer $T_1$.

The secondary of the transformer $T_3$ is connected to the filter capacitors C19 and C20 of the voltage storage source. The other side of the secondary winding of the transformer $T_3$ is connected to a series of 47 microfarad capacitors C101, C102 and C103. The capacitors C101, C102 and C103 are connected respectively to the base electrodes of the transistors Q2, Q3 and Q4. The secondary winding of the transformer $T_3$ is also connected through a diode CR103 to three resistors R101, R102 and R103, the resistors being connected to the base electrodes of the respective transistors Q2, Q3 and Q4.

The coupling circuit described above responds to each pulse output from the pulse generator 12 to render the transistors Q2, Q3 and Q4 conductive, so that current may flow from the voltage source 20 into the transformer $T_1$ for the reasons described above.

The invention provides, therefore, an improved regulated power supply system for converting alternating current into direct current. The power supply system of the invention is light and efficient, and is relatively inexpensive in its construction. The power supply system is capable of maintaining voltage regulation up to full load, and has a falling regulation characteristic for overload conditions, so that the solid state elements of the system are protected. The energy stored in the voltage source capacitors is sufficient to permit the power supply to continue to transfer energy to the output capacitors and thus maintain regulation after an alternating current power failure for a time sufficient to permit the transfer of any information being processed in the equipment powered by the power supply.

It will be appreciated, of course, that although a particular embodiment of the invention has been shown and described, modifications may be made, and it is intended in the claims to cover the modifications which come within the spirit and scope of the invention.

What is claimed is:

1. A power supply system comprising: an electromagnetic unit comprising a transformer having a primary winding and a secondary winding; a unidirectional voltage source coupled to said primary winding of said electromagnetic unit; a switch interconnected between said voltage source and said primary winding; an output circuit coupled to said secondary winding of said electromagnetic unit and including a series-connected unilaterally conductive device; a pulse generating means coupled to said switch for introducing a train of pulses to said switch periodically to close said switch so as to cause current to flow from said voltage source into said electromagnetic unit thereby to create a unidirectional voltage across said output circuit of a polarity such that said unilaterally conductive element is not conductive, and periodically to open said switch to cause unidirectional voltage across said output circuit to reverse so that unidirectional current is released from said electromagnetic unit to said output circuit of a polarity to be conducted by said unilaterally conductive element; control circuit means having an input coupled to said output circuit and having an output coupled to said pulse generating means to prevent said pulse generating means from generating a pulse when the voltage across said output circuit is above a predetermined threshold; a source voltage detector circuit having an input coupled to said voltage source for producing a signal proportional to the voltage of said source, and network means included in said pulse generating means responsive to voltage from said source detector circuit to vary the duration of the individual pulses generated by said pulse generating means in an inverse proportional relationship with the amplitude of said signal from said source detector, so as to cause the product of the duration of the individual pulses generated by said pulse generating means and the amplitude of the voltage from said source to be maintained constant; inhibit control circuit means coupled to said unilaterally conductive element and to said pulse generating means to prevent said pulse generating means from generating a pulse so long as said unilaterally conductive element is conducting, said pulse generating means including capacitive means which is charged to a predetermined value before a new pulse is generated thereby, and said inhibit control circuit means being connected to said capacitive means to prevent said capacitive means from acquiring a charge so long as said unilaterally conductive device is conducting.

2. The power supply system defined in claim 1, in which said capacitive means is connected to a resistor in the aforesaid network means, the current in said resistor being proportional to the voltage from said source detector circuit, and the duration of each pulse generated by said pulse generating means being a function of the current in said resistor.

3. The power supply system defined in claim 1, in which said voltage source includes a diode bridge circuit for rectifying an alternating-current input, and filter capacitor means connected across said diode bridge circuit; and in which said source voltage detector circuit includes a transformer having a primary winding for receiving said alternating-current input, and a full-wave center tap rectifier circuit connected to the secondary winding of the transformer.

4. The power supply system defined in claim 3, in which said full-wave center tap rectifier includes a filter capacitor having substantially the same rate of discharge as said first-named filter capacitor means so that the voltage output of the source voltage detector circuit will track the voltage output of said voltage source proportionately.

* * * * *